(12) United States Patent
Makino et al.

(10) Patent No.: US 6,375,589 B1
(45) Date of Patent: Apr. 23, 2002

(54) ROLLER CHAIN SPROCKET

(75) Inventors: Hiroshi Makino; Hidetsugu Terada, both of Yamanashi (JP)

(73) Assignee: Sankyo Oilless Industry, Tokyo (JP)

( * ) Notice: Subject to any disclaimer, the term of this patent is extended or adjusted under 35 U.S.C. 154(b) by 0 days.

(21) Appl. No.: 09/515,106

(22) Filed: Feb. 29, 2000

(30) Foreign Application Priority Data

Feb. 3, 1999 (JP) ............................................ 11-054125

(51) Int. Cl.$^7$ ................................................. F16H 7/00
(52) U.S. Cl. ........................ 474/148; 474/156; 474/160
(58) Field of Search ................................ 474/148, 152, 474/154–160; 74/465, 468

(56) References Cited

U.S. PATENT DOCUMENTS

| | | | | |
|---|---|---|---|---|
| 4,879,920 A | * | 11/1989 | Kerkhoff | .................... 74/465 |
| 4,945,783 A | * | 8/1990 | Grob | ........................... 74/460 |
| 5,848,948 A | * | 12/1998 | Allen | .......................... 474/156 |
| 5,976,045 A | * | 11/1999 | Young | ......................... 474/160 |
| 6,036,614 A | * | 3/2000 | Baddaria | .................... 474/155 |
| 6,179,741 B1 | * | 1/2001 | Young | ......................... 474/161 |

* cited by examiner

*Primary Examiner*—Charles A Marmor
*Assistant Examiner*—Tisha D. Lewis

(57) ABSTRACT

An improved chain drive mechanism having a closed loop of roller chain passing round the opposite sprocket wheels. The profile of each tooth formed on the circumference of the sprocket wheel is in conformity with the envelope curve traced by a roller when the roller moves with its center following an involute-trochoid curve. The involute-trochoid curve is determined by offsetting the roller pitch line a certain distance apart outside the contact pitch line, and by rotating the contact pitch line on the base circle of the sprocket wheel to allow a point on the roller pitch line to trace a curve. The certain distance is so determined that the roller pitch may be equal to the incremental arc length, which is determined by dividing the circumference of the base circle by the number of teeth.

2 Claims, 5 Drawing Sheets

ROLLER CHAIN SPROCKET

BACKGROUND OF THE INVENTION

1. Field of the Invention

The present invention relates to a chain drive mechanism which is capable of transmitting a rotary or linear movement to an associated mechanism via its chain.

2. Prior Arts

Such a rotary or linear movement transmission comprises two sprocket wheels each having a plurality of teeth formed on its circumference and being separated a given distance, and a length of chain passing round the opposite sprocket wheels.

The profile of the sprocket tooth is defined in many national and international standards. These conventional design use a combination of several circular arcs and straight lines for the profile. For example, FIG. 8 shows a typical conventional design of the tooth profile, where the profile of the tooth C1 of the sprocket wheel is determined as the combination of two circular arcs R1 and R2. Sometimes a straight line is inserted between the two arcs (not shown). Each radius of the two arcs is bigger than the radius R4 of the roller C2. When in transmission, as shown in FIG. 9, there exist gaps D1 and D2 between the roller and sprocket teeth. This gap or backlash causes loss of movement when the transmission is made in reverse direction. This non-theoretical tooth profile causes uncertainty of power transmission, and thus produces noise and vibration.

It is known that the theoretical contact between a circle and a line makes the involute curve as a contour of a point on the line. It is seemed, from this theory, that it is better to use an involute curve as the roller center path for the sprocket tooth. However, it leads to "undercut" of the profile, as described later, and precise transmission cannot be expected.

SUMMARY OF THE INVENTION

One object of the present invention is to provide a chain drive mechanism which is capable of transmitting a rotary movement with precision, causing neither noise nor vibration, and is guaranteed to be free of backlash in reversing the motion.

Another object of the present invention is to provide a method of making a sprocket wheel appropriate for use in such a backlash-free chain drive mechanism.

With our invention, an adequate amount of offset is given between the roller chain pitch line and contact pitch line. By this a theoretically complete contact between rollers and teeth is made throughout the movement without any backlash.

A chain drive mechanism according to the present invention comprises: two sprocket wheels each having a plurality of teeth formed on its circumference, the sprocket wheels being separated in a given distance apart from each other; and a closed loop of chain having means for engaging with the teeth of each sprocket wheel, passing round the opposite sprocket wheels; the means for engaging with the teeth of each sprocket wheel comprising a plurality of rollers arranged at regular intervals, the rollers being so supported in the closed loop of chain as to rotate about their shaft pins, and the profile of each tooth being in conformity with the envelope curve traced by each roller when the roller moves with its center following an involute-trochoid curve, which is determined from the linear movement of the roller and the rotating movement of the sprocket wheel.

The involute-trochoid curve is a theoretical curve determined by displacing the roller center pitch line a certain distance apart outside from the contact pitch line, and by rotating the contact pitch line on the base pitch circle of the sprocket wheel with no slip. Then the roller center point traces the involute-trochoid curve. The certain distance being so determined that the roller pitch length may be equal to the incremental arc length, which is determined by dividing the circumference of the base circle by the number of teeth.

The profile of the tooth is determined by taking account both the linear movement of the roller and the circular arc movement of the sprocket wheel. And therefore, the so determined profile of the tooth assures that each roller precisely contacts to the profile all the time, smoothly moving from tooth to tooth without causing noise and vibration, and that a rotary movement is transmitted with high precision.

The chain drive mechanism may comprise some means for applying pressure strong enough to stretch the closed loop of chain tight between the opposite sprocket wheels. This has the effect of keeping the roller-to-tooth contact condition unchanged all the time. The pressure applying means may include means for increasing the center-to-center distance between the opposite sprocket wheels.

A method of manufacturing the sprocket wheel comprises the step of rotating and moving a cutting tool having the same diameter as the roller with its center following the involute-trochoid curve, which is determined from the linear movement of the roller and the circular arc movement of the sprocket wheel.

Prior to description of one preferred embodiment of the present invention, the principle of the present invention according to which the tooth profile is determined is described below.

First, assuming that a roller contacts on a theoretical involute-derived tooth as shown in FIG. 2, and that the roller stays on Point C on the tooth with its center P on the involute curve, the radius of curvature of the profile $\rho_C$, at Point C is given by:

$$\rho_C = \rho - r_C$$

where $\rho$ stands for the radius of curvature of the roller center path at Point P, and is equal to $r\theta$; $r_C$ stands for the radius of the roller; $\theta$ stands for the angle of rotation of the roller pitch line rotated from the starting point O and r stands for the base circle radius.

In this case, undercut appears on the tooth profile where $r_C$ is larger than $\rho$ ($r_C > \rho$), disturbing normal transmission of movement. The radius of curvature $\rho$ at the start point of the involute curve is zero, and therefore, an undercut will inevitably appear at the tooth bottom even if a roller of minimum size is used. Appearance of such undercuts in the tooth bottom is the cause for lowering the precision with which the roller-and-sprocket drive works.

The inventors discovered that this defect can be eliminated by so designing the tooth profile that the roller pitch line of the chain may be offset a certain distance above the contact pitch line (see FIG. 4), thereby permitting the center of the rotating roller to follow a generic trochoid curve (herein called "involute-trochoid" curve). Then, the minimum radius of convex curvature $\rho_{min}$ of the involute-trochoid curve cannot be zero, so that no undercut may appear at the tooth bottom. The offset amount by which the roller pitch line is put apart from the contact pitch line to remove the undercuts which would otherwise appear is so determined that the minimum radius of convex curvature $\rho_{min}$ may be equal to or larger than the radius of the roller ($\rho_{min} \geq r_C$).

This requirement can be realized by moving the roller with its center following an involute-trochoid curve. Stated otherwise, the tooth needs to be so profiled that the center of the roller may be allowed to follow the involute-trochoid curve. The required tooth profile can be determined as follows.

The roller pitch line is put a certain distance apart from the contact pitch line, and the contact pitch line is rotated round the base circle with no slip to allow a fixed point on the roller pitch line to trace an involute-trochoid curve, as seen in FIG. 5a. A roller J8 is rotated with its center following the involute-trochoid curve, and then points which are apart from the involute-trochoid curve by a distance equal to the radius of the roller J8 are traced to draw the envelope curve of the rotating roller, which gives the required profile of the tooth, as seen in FIG. 5b.

To satisfy the tight chain-winding requirement simultaneously with disappearance of undercuts a certain distance is so determined that the roller pitch may be equal to the incremental arc length, which is determined by dividing the circumference of the base circle by the number of teeth, as described later in detail.

In making the profile of the sprocket as described above, a cutting tool having the same diameter as the roller is rotated and moved with its center following the involute-trochoid curve.

The rollers are so connected to the chain that they may rotate about their shafts, thereby permitting them to rotatably contact the teeth of the sprocket, and therefore the friction between the roller and the tooth can be reduced to minimum, and accordingly the life of the roller-and-sprocket transmission can be extended.

The roller-and-sprocket drive according to the present invention permits two rollers to keep contact from both sides of a particular tooth throughout the whole engagement. Thus, the gapless, smooth engagement can be established both at the linear-to-circular arc transition and at the circular arc-to-linear transition. This is impossible in a conventional roller-and-sprocket drive.

By the gapless engagement attained at all part of the sprocket, the roller-and-sprocket drive according to the present invention is guaranteed to be free of backlash when reversed in motion. The roller-and-sprocket drive, therefore, can be used in a servo control system for precise positioning.

Also, it can make linear movement on the basis of the theoretical constant-speed motion, permitting transmission of power without accompanying noise and vibration.

DETAILED DESCRIPTION OF PREFERRED EMBODIMENT

Figure 1:
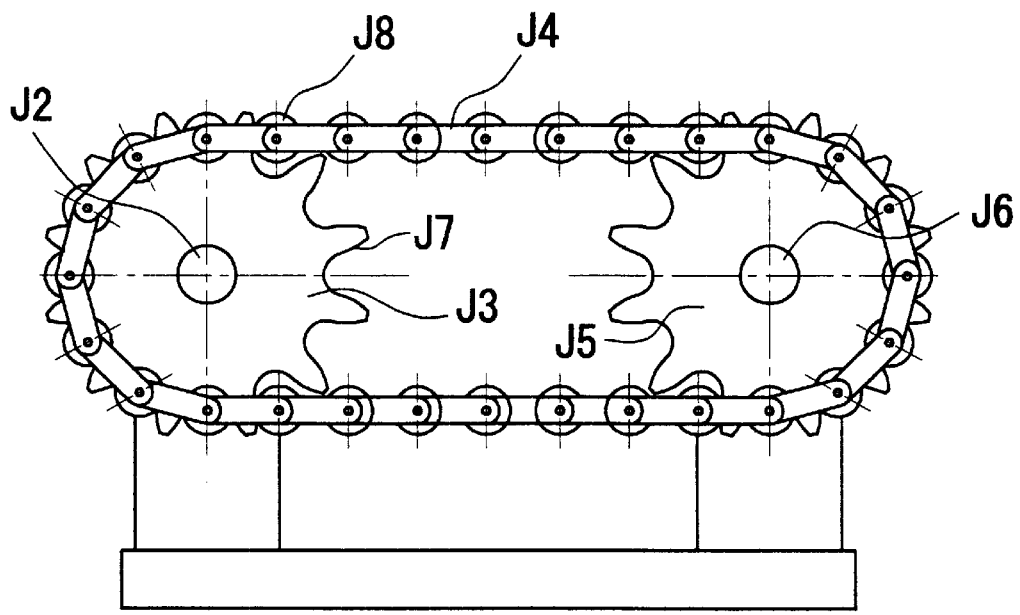
FIG. 1 is a side view of a chain drive mechanism to which the present invention can be applied.
Figure 2:
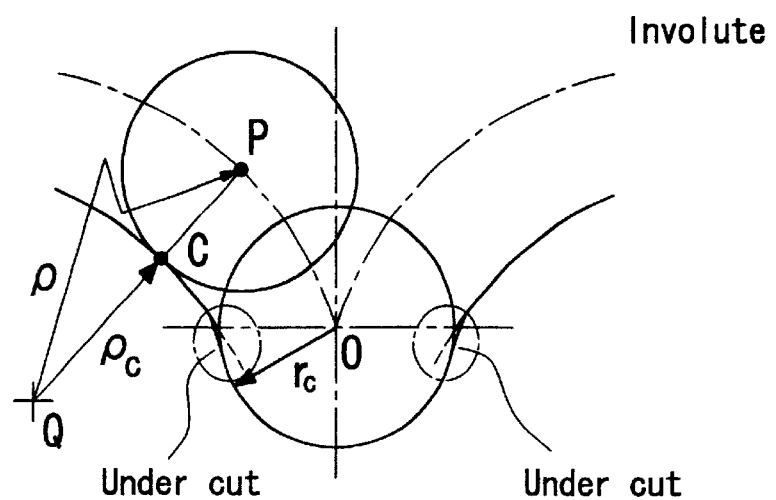
FIG. 2 illustrates how a roller behaves when it moves with its center tracing an involute curve.
Figure 3:
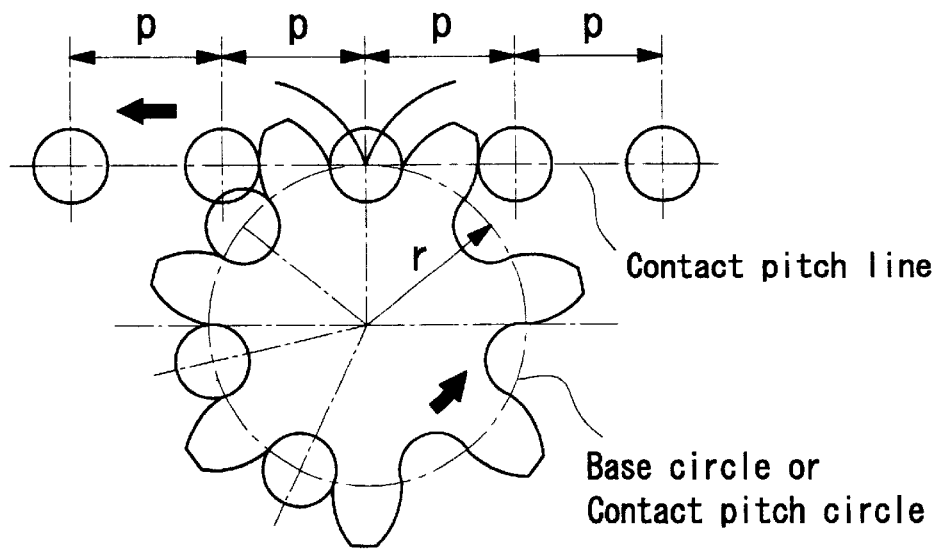
FIG. 3 illustrates how rollers of a linear roller chain engage with the toothed sprocket wheels when each roller rolls with its center tracing an involute curve.
Figure 4:
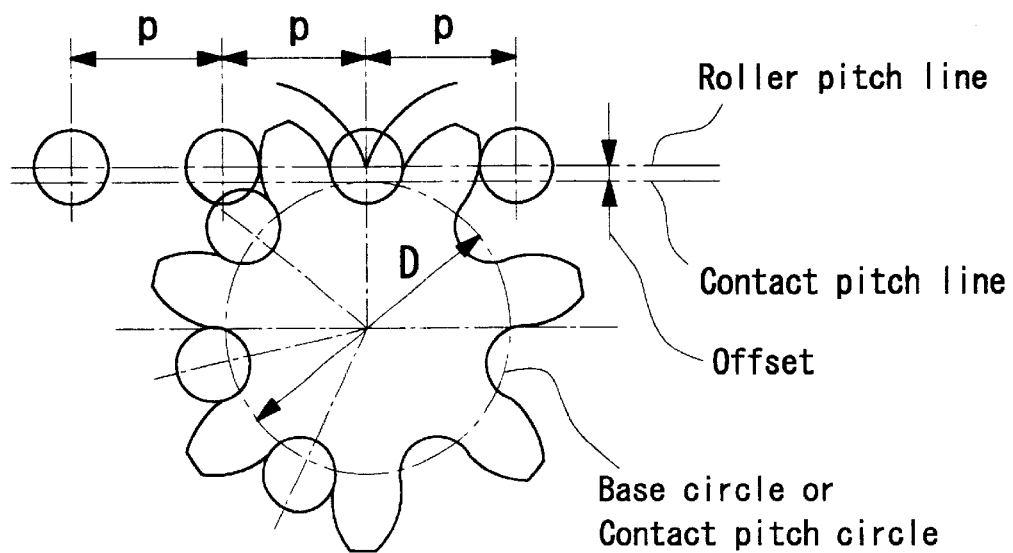
FIG. 4 illustrates how rollers of a linear roller chain engage with the toothed sprocket wheels when each roller rolls with its center tracing an involute-trochoid curve.

Referring to FIG. 1, a chain drive mechanism to which the present invention can be applied comprises two sprocket wheels J3 and J5 and a looped length of roller chain J4 moving round the opposite sprocket wheels J3 and J5. Each sprocket wheel J3 or J5 has a plurality of teeth J7 formed on its circumference, and an axle J2 or J6 integrally connected thereto to rotate as a whole. The chain J4 has a plurality of rollers J8 arranged at a constant pitch and rotatably connected thereto. The rollers J8 of the chain J4 can engage the teeth of the opposite sprocket wheels J3 and J5. In operation, the rotary movement is transmitted from the axle J2 to the sprocket wheel J3 at the input side of the chain drive mechanism, and then, the rotary movement is converted to the linear movement via engagement of the sprocket wheel J3 with the roller chain J4. The linear movement is converted to the rotary movement via engagement of the roller chain J4 with the sprocket wheel J5 at the output side, so that the rotary movement is transmitted to the axle J6.

The distance between the opposite sprocket wheels J3 and J5 can be extended little to apply a controlled pressure to both sprockets, thereby stretching the roller chain J4 tight.

One example of pressure applying means includes spring means for expanding the axes distance between the opposite sprocket wheels J3 and J5. Another example of pressure applying means includes means for spreading the opposite sprocket wheels apart from each other, thereby causing the roller chain J4 to be stretched as tight as required. This latter means is adopted in the chain drive mechanism of FIG. 1.

The teeth of each sprocket wheel J3 or J5 are derived by using an involute-trochoid curve according to the present invention, but a conventional roller chain may be used in engaging the so produced teeth J7 of the sprocket wheel J3 or J5. This versatility permits an existing roller-and-sprocket drive to be changed according to the present invention simply by replacing the sprocket wheels. In case that backlash cannot be removed completely, it is necessary to use a length of roller chain which has sufficient accuracy.

Figure 5A:
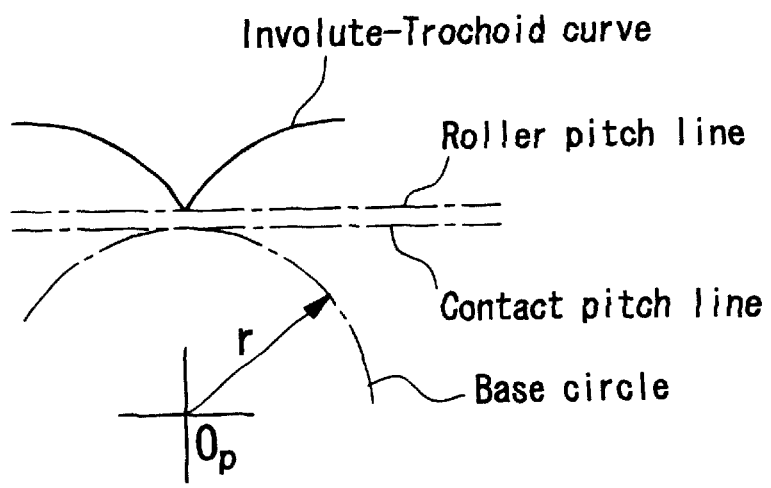
FIGS. 5a and 5b show how the tooth profile can be determined.

Referring to FIG. 5a, the involute-trochoid curve can be given by tracing a fixed point on the roller pitch line when the contact pitch line is rotated on the circumference of the base circle without slip. The roller pitch line is a straight line passing through the centers of the rollers of the roller chain whereas the contact pitch line is a straight line which is tangential to the base circle. Here, it should be noted that the involute-trochoid curve is generic in the sense that involute curve that can be adopted in determining tooth profile of sprocket wheel is included; the involute curve is a particular incident in which no offset is made relative to the contact pitch line.

Figure 5B:
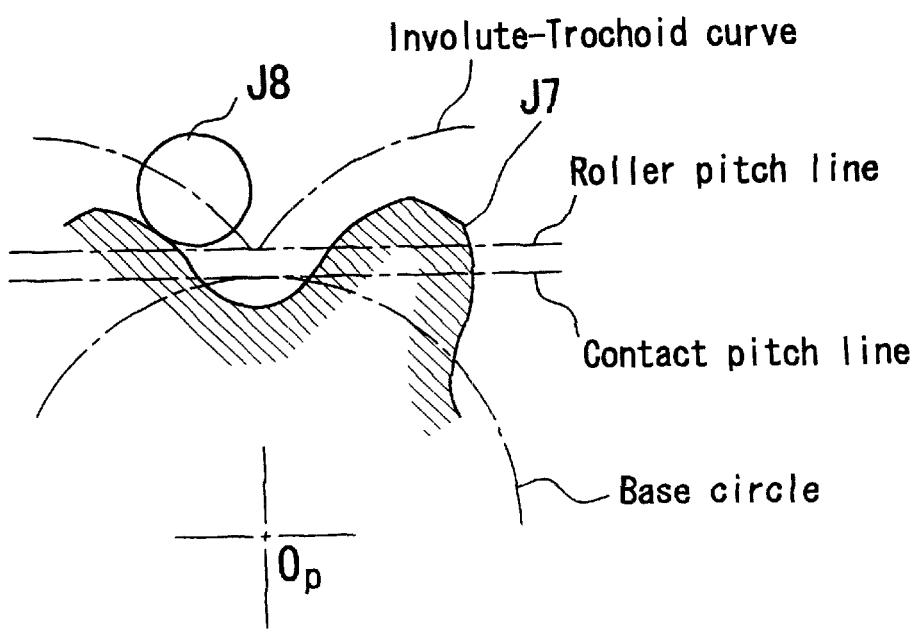

Referring to FIG. 5b, the tooth profile of the sprocket wheel is determined by tracing points which have a distance equal to the radius of the roller J8 apart from the involute-trochoid curve, which is the path of the center of the roller J8 when it engages the tooth J7.

After the roller chain J4 has engaged with the sprocket wheel J3 or J5, the roller chain J4 is wound around the sprocket wheel J3 or J5 to transmit power from one to the other sprocket wheel. Then, a number of rollers J8 of almost semi-circular lengths of the sprocket stay at the tooth bottoms of the sprocket wheels.

To attain the ideal contact of roller to tooth and sequential engagement from the point of mechanism view it is necessary that the requirement for producing the undercut-free tooth profile and the requirement for winding the roller chain tight around the sprocket be satisfied simultaneously.

Specifically, the tight chain-winding requirement is to make the roller pitch to be equal to the incremental circular arc length, which is determined by dividing the circumference of the base circle by the number of tooth.

Figure 6:
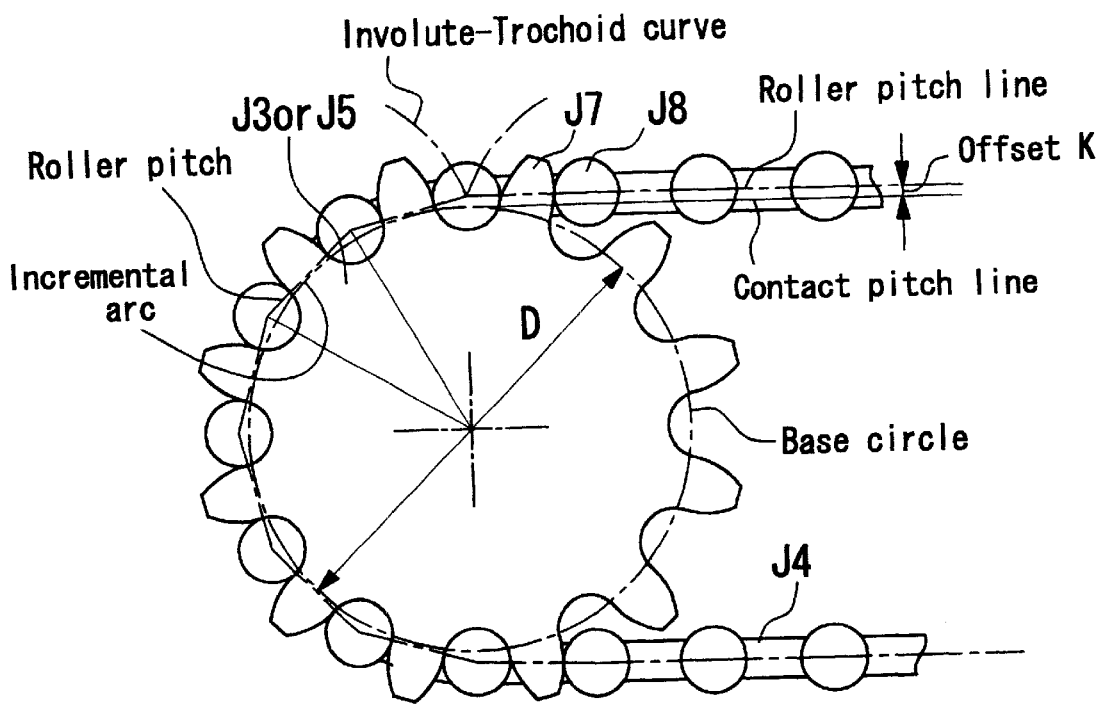
FIG. 6 shows how the roller pitch can be made equal to the incremental circular arc by adjusting the offset of the roller pitch line from the contact pitch line according to the present invention.

This can be attained by displacing the roller pitch line outside the contact pitch line by a distance to permit the center of the roller to follow the involute-trochoid curve (see FIG. 6).

More specifically, the positive amount of offset K is given by:

$$K = y \times m$$

where "y" stands for the offset coefficient, and "m" stands for the module, which is given by D (the diameter of the base circle) divided by z (the number of teeth).

Figure 7:
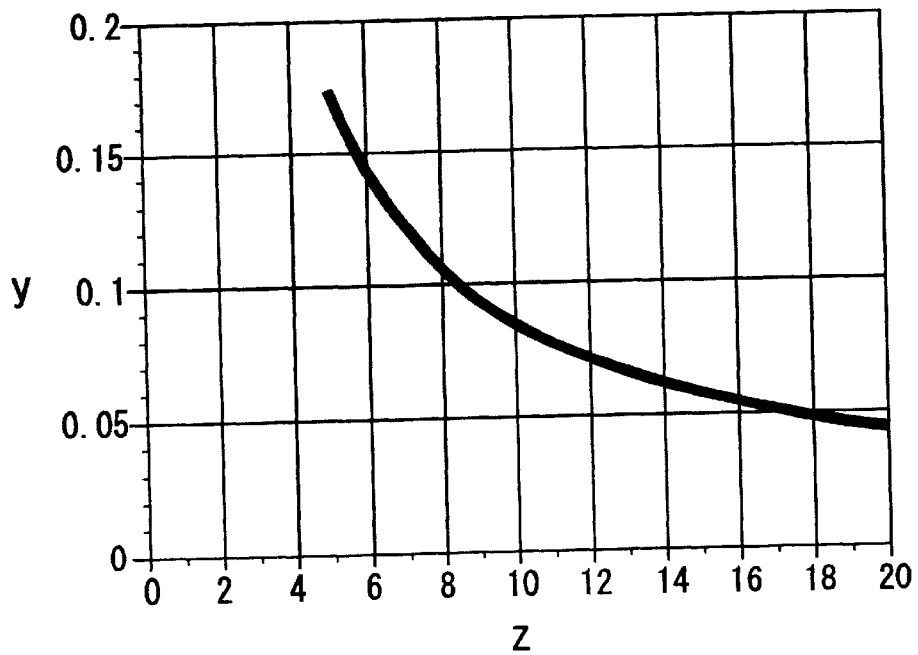
FIG. 7 shows how the amount of adequate offset varies with the number of teeth.
Figure 8:
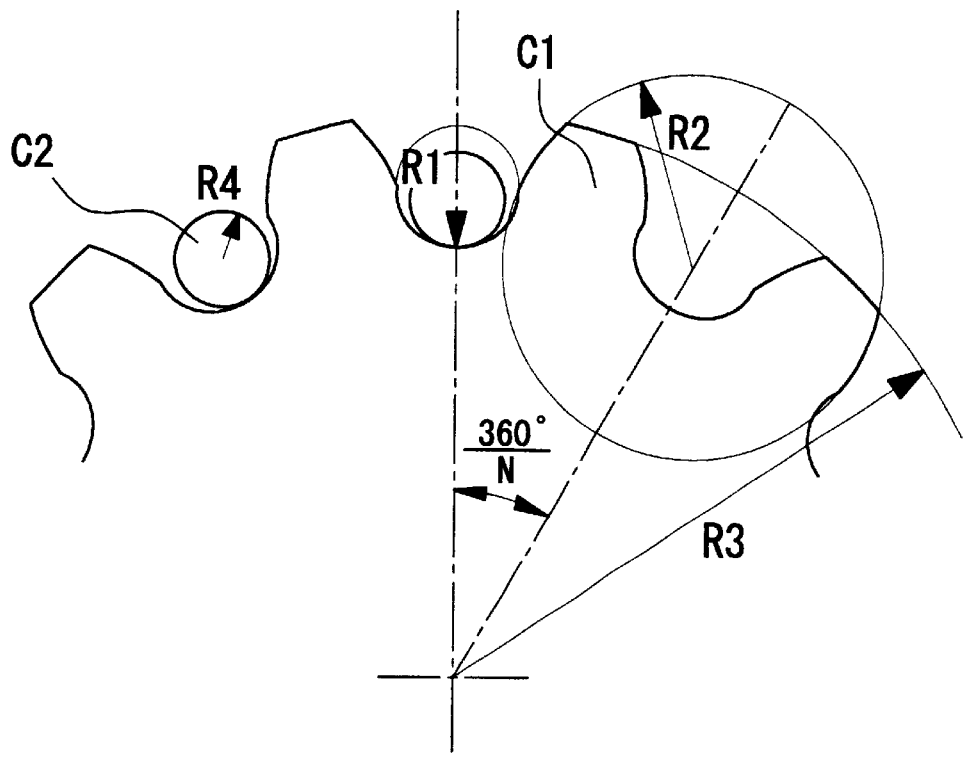
FIG. 8 illustrates how the tooth profile is determined in a conventional sprocket wheel.
Figure 9:
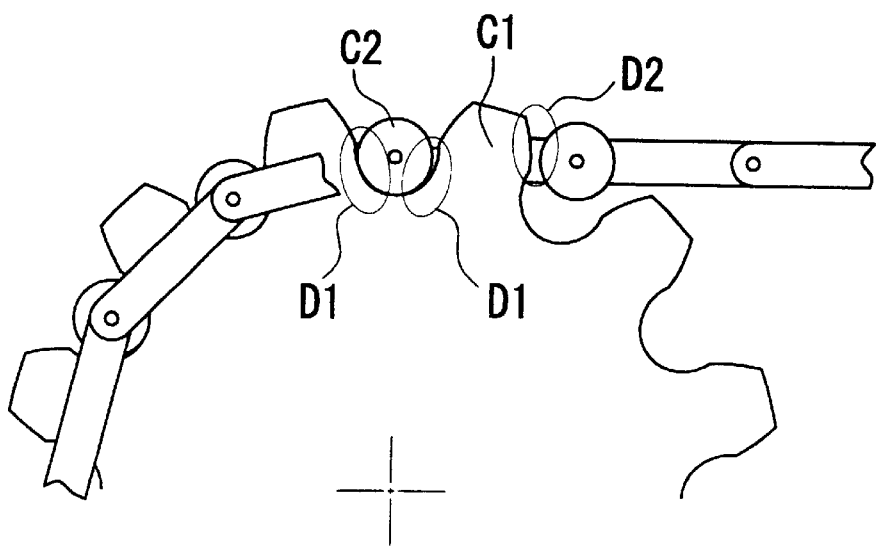
FIG. 9 illustrates how rollers come to contact teeth sequentially one by one in a conventional chain drive mechanism.

The positive amount of displacement is so determined mathematically that the incremental circular arc may be equal to the roller pitch. Referring to FIG. 7, the graphic representation shows how the offset coefficient "y" varies with the number of teeth "z".

As may be understood from the above, the tooth needs to be profiled so that the center of the roller J8 may follow the involute-trochoid curve, and to attain this the tooth profile is given by tracing all points which are a distance equal to the radius of the roller J8 apart from the center of the roller to provide the envelope curve of the circles. Thus, both of the undercut-free tooth shaping and tight chain-winding requirements can be satisfied simultaneously (see FIG. 6).

The gapless, smooth engagement thus attained at the linear-to-circular arc transition, and on the subsequent semi-circular travel has the effects of: guaranteeing the roller-and-sprocket drive to be free of backlash when reversed; permitting the roller-and-sprocket drive to work with precision high enough to meet the requirement for servo-control; and permitting transmission of power without noise and vibration.

What is claimed is:

1. A chain drive mechanism comprising:
   two opposite sprocket wheels each having a plurality of teeth formed on its circumference, the sprocket wheels being separated a given distance apart from each other; and
   a closed loop of chain having means for engaging with the teeth of each sprocket wheel, passing round the opposite sprocket wheels;
   the means for engaging with the teeth of each sprocket wheel comprising a plurality of rolls arranged at regular intervals, the rolls being so supported in the closed loop of chain as to rotate about their pivots, and the contour of each tooth being in conformity with the enclosure curve traced by a selected roll when the roll moves with its center following an involute-trochoid curve, which is determined from the linear-to-circular arc movement of the roll and the circular arc movement of the sprocket wheel;
   wherein the involute-trochoid curve is a theoretical curve determined by displacing the roll pitch line a certain distance apart outside the contact pitch line, and by rotating the contact pitch line on the base circle of the sprocket wheel to allow a fixed point on the so displaced roll pitch line to trace the required involute-trochoid curve.

2. A chain drive mechanism according to claim 1, wherein the certain distance being so determined that the roller pitch may be equal to the incremental arc length, which is determined by dividing the circumference of the base circle by the number of teeth.

* * * * *

UNITED STATES PATENT AND TRADEMARK OFFICE
CERTIFICATE OF CORRECTION

PATENT NO.    : 6,375,589 B1  Page 1 of 1
DATED         : April 23, 2002
INVENTOR(S)   : Hiroshi Makino et al.

It is certified that error appears in the above-identified patent and that said Letters Patent is hereby corrected as shown below:

<u>Title page,</u>
Item [30], Foreign Application Priority Data, should read:
-- March 2, 1999 --

Signed and Sealed this

Twenty-ninth Day of July, 2003

JAMES E. ROGAN
*Director of the United States Patent and Trademark Office*